US010158929B1

(12) United States Patent
Hushchyn et al.

(10) Patent No.: US 10,158,929 B1
(45) Date of Patent: Dec. 18, 2018

(54) SPECIALIZED OPTICAL SWITCHES UTILIZED TO REDUCE LATENCY IN SWITCHING BETWEEN HARDWARE DEVICES IN COMPUTER SYSTEMS AND METHODS OF USE THEREOF (71) Applicants: Yury Hushchyn, Vilnius (LT); Aliaksandr Kotseleu, Minsk (BY)

(72) Inventors: Yury Hushchyn, Vilnius (LT); Aliaksandr Kotseleu, Minsk (BY)

(73) Assignee: Capital Com SV Investments Limited, Limassol (CY)

( * ) Notice: Subject to any disclaimer, the term of this patent is extended or adjusted under 35 U.S.C. 154(b) by 0 days.

(21) Appl. No.: 15/899,618

(22) Filed: Feb. 20, 2018

Related U.S. Application Data (60) Provisional application No. 62/460,210, filed on Feb. 17, 2017.

(51) Int. Cl.
H04B 10/00 (2013.01)
H04Q 11/00 (2006.01)
(Continued)

(52) U.S. Cl.
CPC .......... H04Q 11/0062 (2013.01); G06F 5/06 (2013.01); G06F 13/38 (2013.01); H04B 10/2507 (2013.01); H04B 10/27 (2013.01)

(58) Field of Classification Search
CPC .......... G06F 12/1009; G06F 2212/152; G06F 2212/154; G06F 3/0604; G06F 3/0631; G06F 3/0647; G06F 3/067; G06F 9/4856; G06F 9/4887; G06F 9/5077; H04L 41/12; H04L 41/16; H04L 43/00; H04L 43/0852; H04L 43/0888; H04L 67/1002; H04L 67/1008; H04L 67/101; H04L 12/2859; H04L 29/12216; H04L 47/10; H04L 47/2416; H04L 47/2441; H04B 10/801; H04Q 11/0005; H04Q 11/00058;
(Continued)

(56) References Cited

U.S. PATENT DOCUMENTS 8,559,816 B2    10/2013  Zheng
9,520,961 B2 *  12/2016  Xia ............... H04J 14/0269
(Continued)

OTHER PUBLICATIONS

Nokia, Synchronization as a service, "How to provide phase and time of day information using Precision Time Protocol (PTP) over a transport network: challenges and solutions", 2016, 12 pages.

Primary Examiner — Amritbir Sandhu
(74) Attorney, Agent, or Firm — Greenberg Traurig, LLP (57) ABSTRACT A system includes a switch and first and second servers. The switch receives first data and provides the first data to the first and second servers. The first server determines second data based on the first data and transmits the second data to the switch. The second server determines third data based on the first data in response to a faulty indication that the first server has failed to transmit the second data to the switch and transmits the third data to the switch. The switch transmits fourth data to the second server and a third server. The fourth data is either the second data or the third data. The second data is identical to the third data so as to confirm that one of the second data or the third data is transmitted to the third server when the first server has failed to transmit the second data.

16 Claims, 3 Drawing Sheets (51) Int. Cl.
  *H04B 10/2507*  (2013.01)
  *G06F 13/38*  (2006.01)
  *G06F 5/06*  (2006.01)
  *H04B 10/27*  (2013.01)

(58) Field of Classification Search
  CPC ... H04Q 2011/0016; H04Q 2011/0022; H04Q 2011/0028; H04Q 2011/0032; H04Q 2011/005; H04N 7/17309
  USPC .................................................. 398/45–54
  See application file for complete search history.

(56) References Cited

U.S. PATENT DOCUMENTS

| | | | | |
|---|---|---|---|---|
| 9,654,852 | B2* | 5/2017 | Yin | H04Q 11/0062 |
| 9,832,553 | B2* | 11/2017 | Zhang | H01L 25/065 |
| 2002/0138854 | A1* | 9/2002 | Desai | H04L 12/2801 |
| | | | | 725/147 |
| 2005/0044195 | A1* | 2/2005 | Westfall | H04L 49/101 |
| | | | | 709/223 |
| 2006/0092940 | A1* | 5/2006 | Ansari | H04L 45/00 |
| | | | | 370/392 |
| 2008/0155537 | A1* | 6/2008 | Dinda | G06F 9/4887 |
| | | | | 718/1 |
| 2009/0313503 | A1* | 12/2009 | Atluri | G06F 11/1453 |
| | | | | 714/19 |
| 2011/0038633 | A1* | 2/2011 | DeCusatis | H04L 41/064 |
| | | | | 398/79 |
| 2011/0038634 | A1* | 2/2011 | DeCusatis | H04J 14/0287 |
| | | | | 398/79 |
| 2011/0040860 | A1* | 2/2011 | DeCusatis | H04L 41/0869 |
| | | | | 709/223 |
| 2011/0040896 | A1* | 2/2011 | DeCusatis | H04J 14/0278 |
| | | | | 709/249 |
| 2012/0008944 | A1* | 1/2012 | Singla | H04J 14/0204 |
| | | | | 398/45 |
| 2012/0099863 | A1* | 4/2012 | Xu | H04Q 11/0005 |
| | | | | 398/49 |
| 2012/0250679 | A1* | 10/2012 | Judge | H04L 49/351 |
| | | | | 370/359 |
| 2013/0156425 | A1* | 6/2013 | Kirkpatrick | H04B 10/801 |
| | | | | 398/45 |
| 2014/0092901 | A1* | 4/2014 | Kapadia | H04L 45/745 |
| | | | | 370/390 |
| 2014/0099119 | A1* | 4/2014 | Wei | H04J 14/0257 |
| | | | | 398/79 |
| 2014/0155537 | A1* | 6/2014 | Oriani | C08L 23/16 |
| | | | | 524/504 |
| 2014/0181292 | A1* | 6/2014 | Venkataswami | H04L 41/0677 |
| | | | | 709/224 |
| 2014/0196037 | A1* | 7/2014 | Gopalan | G06F 9/4856 |
| | | | | 718/1 |
| 2014/0212135 | A1* | 7/2014 | Ji | H04Q 11/0066 |
| | | | | 398/51 |
| 2015/0043905 | A1* | 2/2015 | Graves | H04Q 11/0005 |
| | | | | 398/25 |
| 2015/0063807 | A1* | 3/2015 | Simonneau | H04B 10/25 |
| | | | | 398/59 |
| 2015/0098700 | A1* | 4/2015 | Zhu | H04Q 11/0005 |
| | | | | 398/48 |
| 2015/0147060 | A1* | 5/2015 | Patel | H04Q 11/0005 |
| | | | | 398/48 |
| 2015/0295849 | A1* | 10/2015 | Xia | H04L 47/782 |
| | | | | 370/235 |
| 2015/0312657 | A1* | 10/2015 | Yan | H04Q 11/0005 |
| | | | | 398/48 |
| 2015/0326502 | A1* | 11/2015 | Namihira | H04L 43/0811 |
| | | | | 370/401 |
| 2016/0013973 | A1* | 1/2016 | Onoue | H04L 41/0896 |
| | | | | 370/254 |
| 2016/0156999 | A1* | 6/2016 | Liboiron-Ladouceur | H04Q 11/0005 |
| | | | | 398/51 |

* cited by examiner

SPECIALIZED OPTICAL SWITCHES UTILIZED TO REDUCE LATENCY IN SWITCHING BETWEEN HARDWARE DEVICES IN COMPUTER SYSTEMS AND METHODS OF USE THEREOF

CROSS-REFERENCE TO RELATED APPLICATION

This application is a Section 111(a) application relating to and claiming the benefit of commonly owned, U.S. Provisional Patent Application No. 62/460,210, titled "SPECIALIZED OPTICAL SWITCHES UTILIZED TO REDUCE LATENCY IN SWITCHING BETWEEN HARDWARE DEVICES IN COMPUTER SYSTEMS AND METHODS OF USE THEREOF," filed Feb. 17, 2017, which is incorporated herein by reference in its entirety.

FIELD OF THE INVENTION

The present invention relates generally to optical switches. More particularly, the present invention relates generally to optical switches configured to facilitate switching between redundant computing systems with minimal latency.

BACKGROUND

Electronic exchanges are financial exchanges that receive trading instructions electronically from traders and provide a matching process between buying and selling traders. Traders may convey trading instructions to financial exchanges through the use of trading servers, and may operate backup trading servers to provide redundancy to primary trading servers. In situations where a primary trading server fails for any reason, a changeover to a backup trading server should happen with as short a latency period as possible.

SUMMARY OF THE INVENTION

In some embodiments, a system includes at least one switch, at least one first server, at least one second server, and a precision time protocol master clock, the at least one switch including at least one first optical tap, at least one relay, and at least one second optical tap, the at least one first server including a first internal clock and being configured to synchronize the first internal clock with the precision time protocol master clock in accordance with a precision time protocol, the at least one second server including a second internal clock and being configured to synchronize the second internal clock with the precision time protocol master clock in accordance with the precision time protocol, the precision time protocol master clock being configured to perform a time synchronization of the at least one first server and the at least one second server in accordance with the precision time protocol, the at least one first optical tap being configured to: i) receive a first data stream from at least one third server, ii) split the first data stream into a first copy data stream and a second copy data stream, iii) transmit the first copy data stream to the at least one first server, and iv) transmit the second copy data stream to the at least one second server, the at least one relay being configured to: i) receive a second data stream from the at least one first server, wherein the at least one first server has generated the second data stream in response to the first copy data stream, ii) receive a third data stream from the at least one second server, wherein the at least one second server has generated the third data stream in response to: 1) the second copy data stream and 2) at least one faulty indication, identifying that the at least one first server has failed to transmit the second data stream, and iii) transmit a fourth data stream to the at least one second optical tap, wherein the fourth data stream is either the second data stream or the third data stream based on a receipt of a switching indicator by the at least one relay, the at least one second optical tap being configured to: i) receive the fourth data stream, ii) split the fourth data stream into a third copy data stream and a fourth copy data stream, iii) transmit the third copy data stream to the at least one third server, and iv) transmit the fourth copy data stream to the at least one second server, wherein the second data stream is identical to the third data stream so as to confirm that one of the second data stream or the third data stream is transmitted to the at least one third server when the at least one first server has failed to transmit the second data stream.

In some embodiments, the first data stream is an optical data stream.

In some embodiments, the at least one first optical tap includes at least one of a planar light-wave circuit splitter, a fused biconical taper splitter, and a thin film splitter. In some embodiments, the at least one second optical tap includes at least one of a planar light-wave circuit splitter, a fused biconical taper splitter, and a thin film splitter.

In some embodiments, the precision time protocol master clock is configured to perform the time synchronization periodically at a frequency that is between once per second and one hundred times per second.

In some embodiments, a method includes providing at least one switch, the at least one switch comprising at least one first optical tap, at least one relay, and at least one second optical tap; providing at least one first server, the at least one first server comprising a first internal clock, wherein the at least one first server is configured to synchronize the first internal clock with a precision time protocol master clock in accordance with a precision time protocol; providing at least one second server, the at least one second server comprising a second internal clock, wherein the at least one second server is configured to synchronize the second internal clock with the precision time protocol master clock in accordance with the precision time protocol; providing the precision time protocol master clock, wherein the precision time protocol master clock is configured to perform a time synchronization of the at least one first server and the at least one second server in accordance with the precision time protocol; operating the at least one first optical tap to: i) receive a first data stream from at least one third server, ii) split the first data stream into a first copy data stream and a second copy data stream, iii) transmit the first copy data stream to the at least one first server, and iv) transmit the second copy data stream to the at least one second server; operating the at least one relay to: i) receive a second data stream from the at least one first server, wherein the at least one first server has generated the second data stream in response to the first copy data stream; ii) receive a third data stream from the at least one second server, wherein the at least one second server has generated the third data stream in response to: 1) the second copy data stream and 2) at least one faulty indication, identifying that the at least one first server has failed to transmit the second data stream; and iii) transmit a fourth data stream to the at least one second optical tap, wherein the fourth data stream is either the second data stream or the third data stream based on a receipt of a switching indicator by the at least one relay; operating the second optical tap to: i) receive the fourth data stream, ii) split the fourth data stream into a third copy data stream and a fourth copy data stream, iii) transmit the third copy data stream to the at least one third server, and iv) transmit the fourth copy data stream to the at least one second server, wherein the second data stream is identical to the third data stream so as to confirm that one of the second data stream or the third data stream is transmitted to the at least one third server when the at least one first server has failed to transmit the second data stream.

DETAILED DESCRIPTION

The present invention can be further explained with reference to the included drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

For instance, the principles, methods, systems, and devices of the present invention can be implemented, with or without any modification(s) that may become apparent to those of ordinary skill in the art, in numerous industries, environments, and computing devices such as, but not limited to, aviation, industrial control, computers, medical devices, financial terminals, utilities management, home security, critical infrastructure computing systems (e.g., traffic lights, power grids, etc.), and other similarly suitable applications.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds (e.g., 5-10 seconds).

As used herein, the term "dynamic(ally)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.).

While principles of the present invention are further explained in an application related to financial trading activities, the present invention is not limited to such application, and a person skilled in the art of optical networks would understand that the present invention can be similarly applied in any other industry. For example, the present invention can be applied for minimizing down-time in automated manufacturing processes, processing Internet ecommerce transactions, telecommunication transmissions, and other similarly suitable applications.

Exemplary Implementations of the Present Invention in the Financial Trading Environment Electronic exchanges are financial exchanges that receive trading instructions electronically from traders and provide a matching process between buying and selling traders. Traders may convey trading instructions to financial exchanges through the use of trading servers, and may operate backup trading servers to provide redundancy to primary trading servers. In situations where a primary trading server fails for any reason, a changeover to a backup trading server should happen with as short a latency period as possible.

In some embodiments, specially programmed computing systems and associated devices are configured to facilitate a data transfer to and from a financial exchange which is a central marketplace with established rules and regulations where buyers and sellers, referred to as traders, meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. An electronic exchange typically provides a matching process between buying and selling traders. Electronic exchanges have made it possible for an increasing number of people to actively participate in a market at any given time. The increase in the number of potential market participants has led to, among other things, a more competitive market and greater liquidity. Some example exchanges are Eurex, LIFFE, CME, and CBOT.

With respect to electronic exchanges, traders may connect to an electronic exchange trading platform by way of a communication link through their user terminals. Once connected, traders may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Client entities, such as computers being used by traders to trade, are typically connected to an electronic exchange by way of a communication link to facilitate electronic messaging between the trading entities and the exchange. The messaging may include market information that is distributed from the electronic exchange to traders, as well as orders, quotes, acknowledgements, fills, cancels, deletes, cancel and replace, and other well-known financial transaction messages. Although the amount or type of market information published by an electronic exchange often differs, there are typically some standard pieces of information. For instance, market information usually includes the inside market, which generally includes the current lowest sell price (often referred to as the best ask) and the current highest buy price (often referred to as the best bid). Market information may also include market depth, which generally refers to quantities available in the market at the price levels other than those corresponding to the inside market. In addition to providing order book information including price and quantity information, electronic exchanges can offer other types of market data such as the open price, settlement price, net change, volume, last traded price, last traded quantity, and order fill information.

Once a trader at the client entity receives the market information, it may be displayed on the trading screen. Upon viewing the market information, traders can take certain actions including the actions of sending buy or sell orders to the electronic market, adjusting existing orders, deleting orders, or otherwise managing orders.

In some embodiments, the inventive specially programmed computing systems with associated devices are configured to increase the speed with which trading data is transferred for execution and minimize or eliminate any potential "down-time" that could occur due to malfunctioning of computer systems (e.g., trading servers) utilized by traders for trading and additional actions.

In some embodiments, the inventive specially programmed computing systems with associated devices are configured to monitor and duplicate the network traffic over at least one optical connection. In some embodiments, the inventive specially programmed computing systems with associated devices are configured to monitor the network traffic to identify devices and/or communication pathways that are not performing to predetermined desirable operational characteristic(s), such as, but not limited to, traffic bottlenecks and link disconnections, and to redirect (e.g., switch) traffic to and/or from a particular network connection. For example, in some embodiments, if an exemplary inventive specially programmed computing system with associated device(s) determines that a particular server is not performing appropriately (e.g., the server is damaged), the exemplary inventive specially programmed computing system can switch, in real-time, that connection to a different server. Consequently, the exemplary inventive specially programmed computing system with associated device(s) is configured to at least reduce or eliminate any latency which otherwise could have developed due to a need to switch network traffic from the damaged server to another (back-up) server.

In some embodiments, the exemplary inventive specially programmed computing system with associated device(s) is also configured to mitigate various events which can occur within the financial trading environment (e.g., algorithmic trading on stock, commodity, and/or currency exchanges), such as, but not limited to, drop in liquidity, substantial deviation in behavior of market players, and any other events that could result in a dramatic decline in trading performance and/or a freeze in order executions.

In some embodiments, the exemplary inventive specially programmed computing system with associated device(s) is also configured to monitor traffic over an optical connection (s) between a computer system of an exemplary exchange and particular trading server(s) to perform tasks such as, but not limited to, logging events, conducting real-time analysis of executed deals, performing risk management, allocating commission, and other trading and/or network related activities linked to having the ability to process relevant data on the particular server(s).

In some embodiments, the exemplary inventive specially programmed computing system with associated device(s) is also configured to replicate the monitored traffic and store traffic data at at least one back-up (e.g., secondary) location (e.g., at least one secondary trading server). In some embodiments, the exemplary inventive specially programmed computing system with associated device(s) is also configured to monitor and replicate traffic without affecting the timing and structural integrity of the monitored data traffic. In some embodiments, because of the replication capability, the exemplary inventive specially programmed computing system with associated device(s) is also configured to switch, in real time, from a primary trading server to a back-up trading server. Consequently, the exemplary inventive specially programmed computing system with associated device(s) is configured to perform, at the same instance in real-time, monitoring and switching functions.

In some embodiments, the exemplary inventive specially programmed computing system with associated device(s) is configured to, at least, eliminate any potential network latency and minimize any decrease in the strength of the optical signal.

In some embodiments, associated device(s) of the exemplary inventive specially programmed computing system can be configured to function without any power supply (e.g., can be configured as passive equipment). In some embodiments, associated device(s) of the exemplary inventive specially programmed computing system can be configured to utilize power supplied through a USB stick (e.g., 5V).

In some embodiments, associated device(s) of the exemplary inventive specially programmed computing system can be configured to be remotely controlled.

Figure 2:
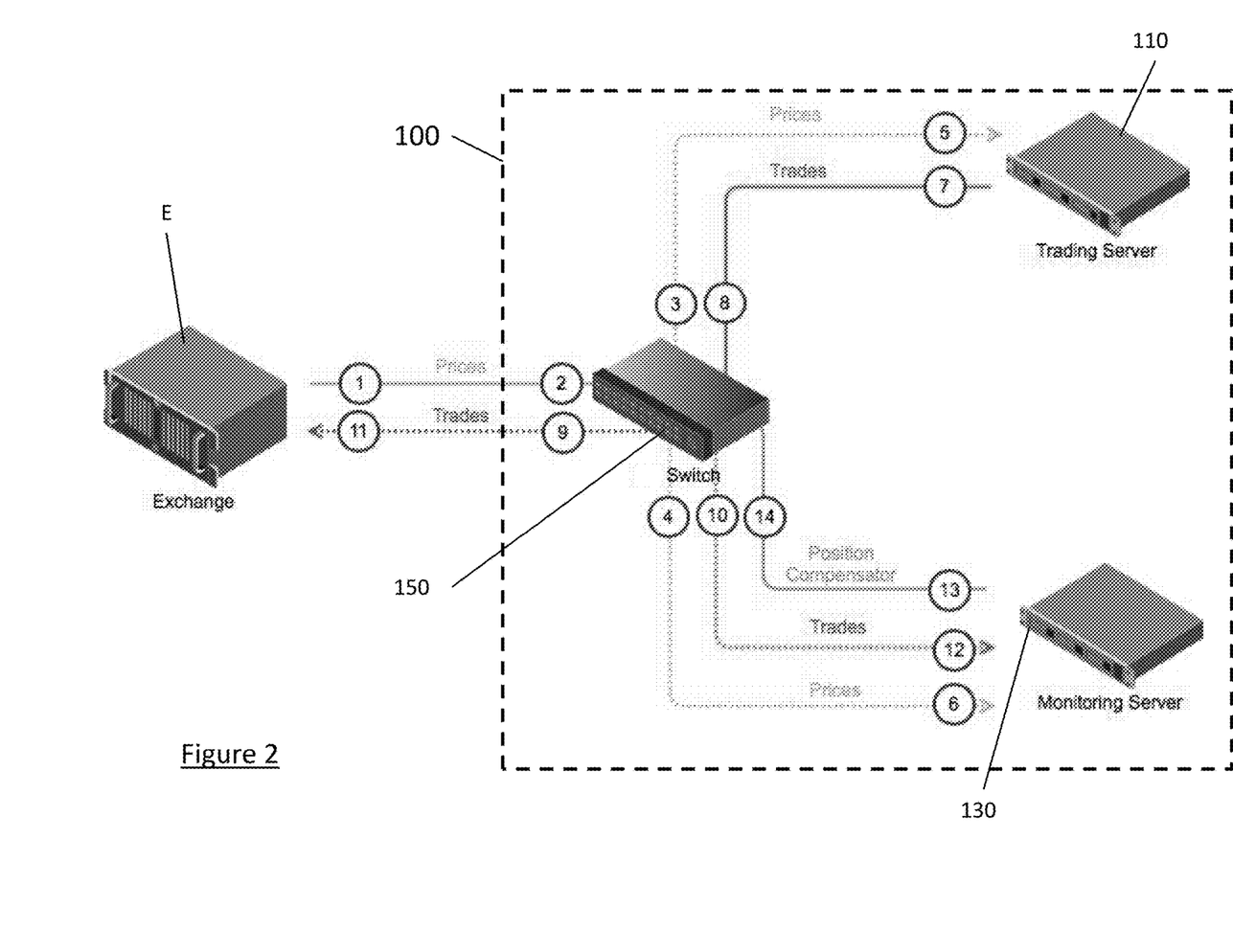
FIG. 2 shows a diagram of an exemplary flow of data within the exemplary specially programmed computing system with associated devices of FIG. 1.

FIG. 2 shows a diagram of an exemplary inventive specially programmed computing system with associated devices (hereinafter collectively "system 100"), including an illustration of an exemplary dataflow over optical network connections within the system 100 as operated in accordance with some principles of the present invention. In some embodiments, the system 100 includes a trading server 110 (e.g., a primary trading server), a monitoring server 130 (e.g., a backup trading server), and a switch 150. In some embodiments, the system 100 is configured to operate in communication with an exchange E. In some embodiments, the system 100 is configured to communicate with the exchange E from a remote location.

In one example, a computer system of a trading exchange platform (e.g., the exchange E shown in FIG. 2) transmits output pricing data 1, such as data regarding real-time prices for various financial instruments being traded on the trading exchange, to the system 100. The system 100 is communicatively coupled to the exchange E such that the switch 150 receives the output pricing data 1 as input pricing data 2. In some embodiments, the switch 150 receives the input pricing data 2 via a fiber optic data link. In some embodiments, the switch 150 includes a first optical tap that is configured to duplicate (e.g., split) the input pricing data 2, utilizing optical tapping, into at least two output pricing data streams (3 and 4. In some embodiments, the first optical tap is a passive fiber optic tap.

Continuing to refer to FIG. 2, the first output pricing data stream 3 reaches at least one intake channel of the trading server 110, which is a primary intended destination for the pricing data, as input pricing data stream 5. The second output pricing data stream 4 reaches at least one intake channel of the monitoring server 130, which is a back-up server and a secondary intended destination for the pricing data, as input pricing data 6. In some embodiments, the trading server 110 and the monitoring server 130 are configured to determine trading orders to be made based on the pricing data 5 and 6, respectively. In some embodiments, the trading server 110 and the monitoring server 130 execute algorithms to determine trading orders to be made based on the pricing data 5 and 6, respectively. In some embodiments, the trading server 110 and the monitoring server 130 are configured to determine trading orders in an identical manner, such that when the trading server 110 and the monitoring server 130 are provided with identical pricing data 5 and 6, respectively, the trading server 110 and the monitoring server 130 will determine identical trading orders to be made.

Continuing to refer to FIG. 2, the exemplary trading server transmits, to the switch 150, output trading data 7 regarding trading orders to be executed by the exchange E. The output trading data 7 reaches the switch 150 as input trading data 8. In some embodiments, the switch 150 includes a second optical tap that is configured to duplicate (e.g., split) the input trading data 8 to produce at least two output trading data streams 9 and 10. In some embodiments, the second optical tap is a passive fiber optic tap. The output trading data 9 is transmitted out of the system 100 and reaches at least one intake channel of the computer system of the exchange E as input trading data 11.

Continuing to refer to FIG. 2, the second output trading data stream 10 reaches at least one intake channel (via a network interface controller (NIC)) of the monitoring server 130 in the as input trading data 12 so that the monitoring server 130 is always updated in real-time as to the last data that was successfully transmitted by the trading server 110 via the switch 150. As noted above, in some embodiments, the monitoring server 130 is configured to determine trading orders to be made based on the pricing data 6. In some embodiments, the monitoring server 130 compares the input trading data 12 (i.e., which indicates trades that have been instructed by the trading server 110) to the trading orders that the monitoring server 130 has determined to be made based on the pricing data 6. In some embodiments, if the input trading data 12 differs from the trading orders that the monitoring server 130 has determined, the monitoring server 130 determines that the trading server 110 is faulty. If it has been determined that the trading server 110 is faulty, the monitoring server 130 transmits output trading data 13 to the switch 150. In some embodiments, because the trading server 110 and the monitoring server 130 are configured to determine the same trading orders based on the same pricing data, the output trading data 13 represents the same trading orders as those which would have been otherwise be transmitted by the trading server 110, had the trading server 110 not been faulty. The output trading data 13 reaches the 150 switch as input trading data 14. The switch 150 transmits the input trading data 14 out of the system 100 as the output trading data 9, which reaches the at least one intake channel of the computer system of the exchange E as the input trading data 11.

In some embodiments, the trading server 110 and the monitoring server 130 operate based on instructions provided by a trader (e.g., a person providing trading instructions). In some embodiments, instructions are provided by a trader to the trading server 110 and to the monitoring server 130 simultaneously. In some embodiments, instructions are provided by a trader to the trading server 110 by a primary channel, and to the monitoring server 130 by a secondary channel that becomes active if the monitoring server 130 determines that the trading server 110 is faulty, as discussed above. In some embodiments, a switch (e.g., a relay) provides for switching between the primary and secondary channels.

Figure 3:
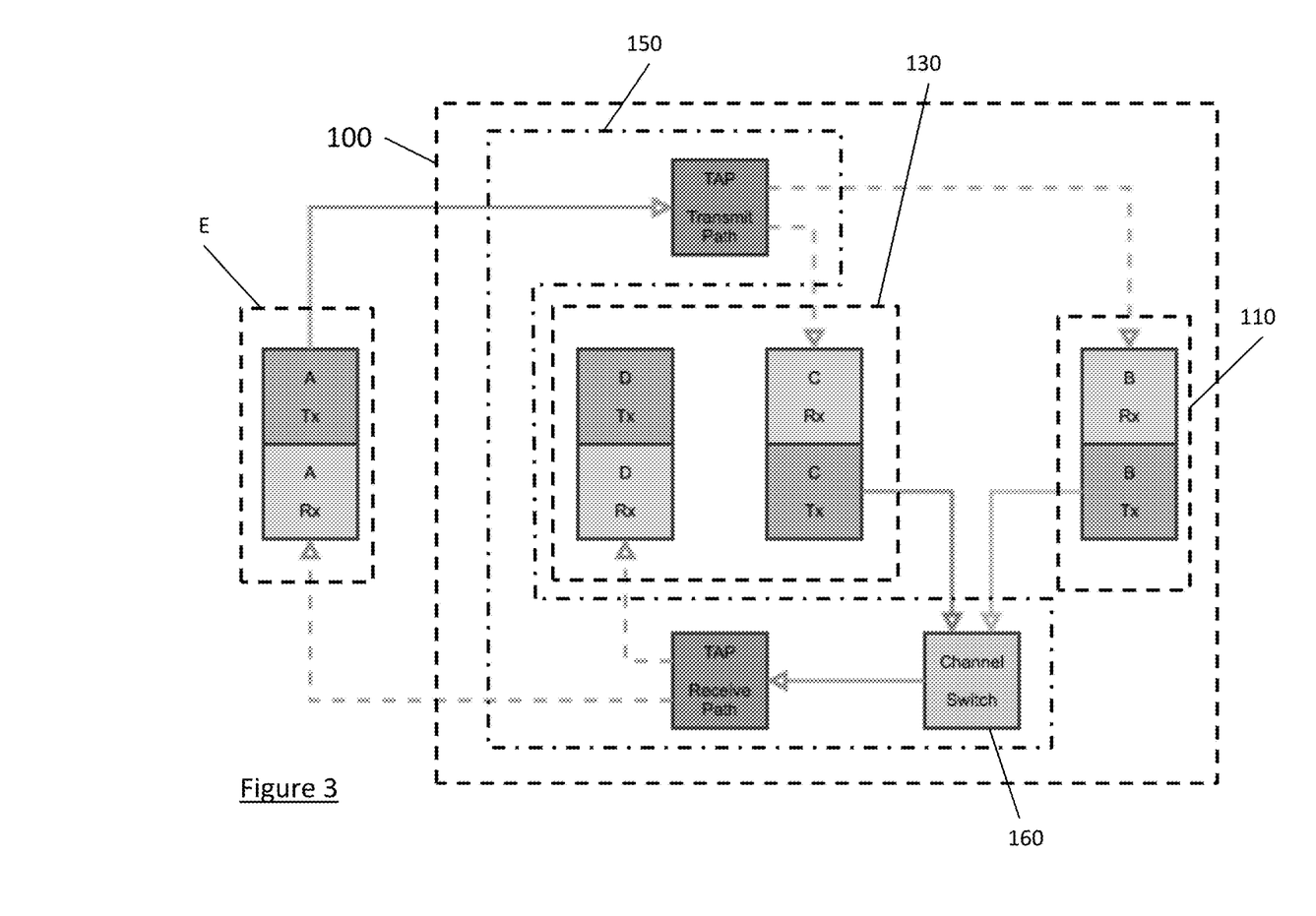
FIG. 3 shows a diagram of an exemplary setup of optical data connections in the exemplary specially programmed computing system with associated devices of FIG. 1.

FIG. 3 shows a diagram of an exemplary set-up of optical connections of the system 100 as operated in accordance with some principles of the present invention. The term "Tx" in FIG. 3 identifies a source of an optical signal carrying communicated data, and the term "Rx" identifies a receiver of the optical signal. In FIG. 3, the trading server 110 of the exemplary system 100 communicates data traffic with an exchange server E via optical connections. In FIG. 3, the monitoring server 130 is configured to monitor and analyze the traffic between the trading server 110 and the exchange E. As FIG. 3 demonstrates, in one illustrative example, the system 100 is configured such that data sent by the trading server "A Tx" reaches the switch 150, which, in some embodiments, includes a "TAP Transmit Path" module that is a first optical tap which, as discussed above, is configured to duplicate the "A Tx" data (e.g., pricing data) in at least two data streams directed into: (1) an input channel ("B Rx") of the trading server 110, and (2) an input channel ("C Rx") of the monitoring server 130.

Continuing to refer to FIG. 3, in one illustrative example, the system 100 is configured such that the communicated data (e.g., trading data) reaches a relay "Channel Switch" module 160 (hereinafter "relay 160") of the switch 150 from 1) an output channel ("B Tx") of the trading server 110, when the trading server 110 functions properly, and 2) an output channel ("C Tx") of the monitoring server 130, when the monitoring server 130 is required to perform as a back-up server due to a deficiency with the trading server 110, a problem with the connection between the trading server 110 and the switch 150, or any other flaw that may prevent data (e.g., trading data) from being properly transmitted from the trading server 110 to the switch 150. In some embodiments, when the monitoring server 130 transmits trading data to the switch 150, the monitoring server 130 also transmits a channel-switching signal to the switch 150, and receipt of the channel-switching signal prompts the relay 160 to transmit trading data received from the monitoring server 130 rather than trading data received from the trading server 110.

In some embodiments, the monitoring server 130 is configured to alert an individual (e.g., a trader, etc.) when it has begun transmitting trading data to the switch 150. In some embodiments, an individual may repair the defect (e.g., power outage, network outage, etc.) that caused the trading server 110 to fail to transmit trading data to the switch 150, and may then manually reconfigure the switch 150 so as to switch back to conveying trading data from the trading server 110. In some embodiments, the monitoring server 130 is configured to detect that the trading server 110 has returned to normal operation (e.g., by being communicatively coupled to the trading server 110) and to automatically instruct the switch 150 to switch back to conveying trading data from the trading server 110.

Continuing to refer to FIG. 3, in one illustrative example, the system 100 is configured such that the communicated data (e.g., trading data) from the "Channel Switch" module of the switch 150 is transmitted via a "TAP Receive Path" module that is a second optical tap which is configured to duplicate the data exiting the "Channel Switch" module into at least two data streams directed into: 1) an input channel ("A Rx") of the exchange E and 2) an input channel ("D Rx") of the monitoring server 130.

Figure 1:
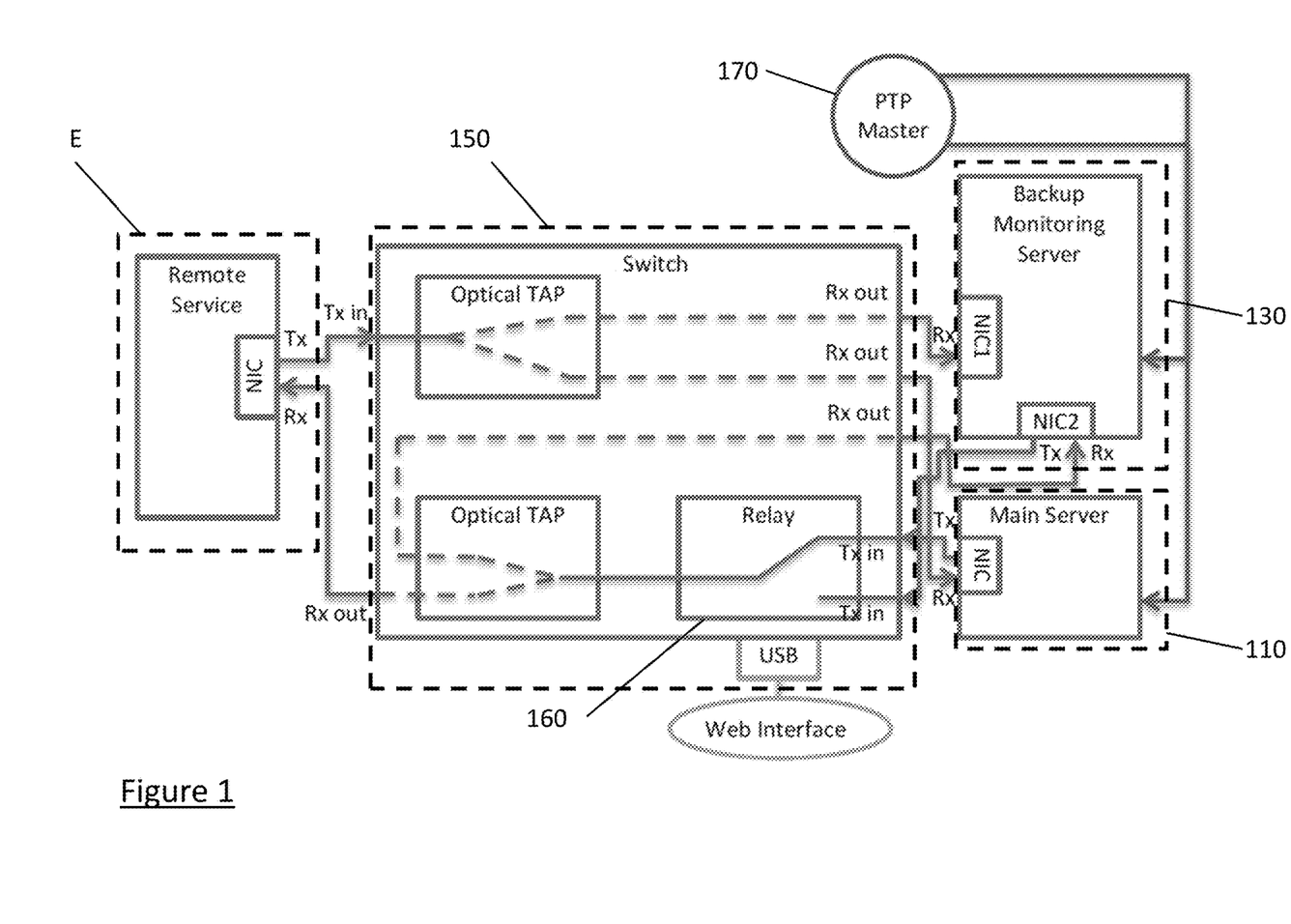
FIG. 1 shows a specially programmed computing system with associated devices according to an exemplary embodiment.

Exemplary Illustrations of Some Implementations of Synchronization Utilized by the Present Invention FIG. 1 shows a diagram of another exemplary set-up of optical connections of the system 100 operated in accordance with some principles of the present invention. In some embodiments, the system 100 is configured to provide time synchronization between at least the trading server 110 and the monitoring server 130. In some non-limiting embodiments, the system 100 is configured to utilize a precision time protocol ("PTP") to achieve time synchronization between at least the trading server 110 and the monitoring server 130. In some embodiments, the PTP operates in accordance with the IEEE 1588-2008 standard, otherwise known as IEEE 1588v2. To facilitate time synchronization, in some embodiments, the system 100 includes a PTP master clock 170. In some embodiments, the PTP master clock 170 is integrated into the switch 150. In some embodiments, the PTP master clock 170 is separate from the switch 150. In some embodiments, the PTP supports system-wide time synchronization accuracy in the sub-microsecond range (e.g., less than 30 microseconds (µs), less than 20 µs, less than 10 µs, less than 5 µs, less than 4 µs, less than 3 µs, less than 2 µs, less than 1 µs, etc.) In some embodiments, the PTP includes the transmission of a synchronization message ("Sync"), which is a multicast periodically sent to the trading server 110 and the monitoring server 130 at a fixed time interval (e.g., a "sync interval"). In some embodiments, the "Sync" message can be transmitted at a sync interval which is selected between 1-4 sync messages per second. In some embodiments, the "Sync" message can be transmitted at a sync interval which is selected between 1-10 sync messages per second. In some embodiments, the "Sync" message can be transmitted at a sync interval which is selected between 1-50 sync messages per second. In some embodiments, the "Sync" message can be transmitted at a sync interval which is selected between 1-100 sync messages per second.

In some embodiments, the PTP operates as described herein. In some embodiments, the PTP is performed substantially identically with respect to both the trading server 110 and the monitoring server 130. However, for brevity, only the performance of the PTP with respect to the trading server 110 is described herein. In some embodiments, the PTP begins with the transmission of a "Sync" message by the PTP master clock 170 to the trading server 110. In some embodiments, the "Sync" message includes a timestamp of the time ("$T_1$") at which the "Sync" message was sent; the "Sync" message may include such a timestamp in embodiments in which the PTP master clock 170 includes hardware having the capability to send an accurate time stamp in the "Sync" message. In some embodiments, the "Sync" message does not include a time stamp, and the PTP master clock 170 sends a "Follow-Up" message after the sending the "Sync" message and including a time stamp of the time at which the "Sync" message was sent; the "Follow-Up" message may be used in embodiments in which the PTP master clock 170 does not include hardware having the capability to send an accurate time stamp in the "Sync" message. In some embodiments, the trading server 110 generates a hardware timestamp of the time ("$T_1'$") when the "Sync" message is received. In some embodiments, upon receipt of the time-stamped "Sync" message, the trading server 110 generates and sends to the PTP master clock 170 a "Delay-Request" message, and generates and retains a hardware timestamp indicating the time ("$T_2$") when the "Delay-Request" message was sent. In some embodiments, upon receipt of the "Follow-Up" message indicating the time when the "Sync" message was sent, the trading server 110 generates and sends to the PTP master clock 170 a "Delay-Request" message, and generates and retains a hardware timestamp indicating the time ("$T_2$") when the "Delay-Request" message was sent. In some embodiments, upon receipt of the "Delay-Request" message, the PTP master clock 170 will records a timestamp of the time ("$T_2'$") when the "Delay-Request" message was received and sends this timestamp back to the trading server 110 in a "Delay-Response" message.

In some embodiments, the trading server 110 utilizes the timestamp information derived from the message sequence to calculate 1) the one-way-delay between the trading server 110 and the PTP master clock 170, and 2) the time offset between the PTP master clock 170 and the internal clock of the trading server 110. In some embodiments, the offset is calculated by the equation:

$$\partial = \frac{1}{2}(T_1' - T_1 - T_2' + T_2)$$

In some embodiments, the delay d is calculated by the equation:

$$d = T'_1 - T_1 - \delta$$

In some embodiments, once the offset δ has been calculated, the trading server 110 adjusts its internal clock to synchronize with that of the PTP master clock 170. As noted above, the monitoring server 130 synchronizes its internal clock with that of the PTP master clock 170 in an identical manner. As a result, the internal clocks of the trading server 110 and of the monitoring server 130 are synchronized with one another. By virtue of this synchronization, Illustrative Examples of Some Hardware Characteristics Applicable to the Inventive Devices the Present Invention In some embodiments, the switch 150 is powered by a USB power supply. In some embodiments, the switch 150 is configured to operate such that, even without the USB power supply (e.g., if power is interrupted), the switch 150 remains a fully-featured functioning device that works as the optical network tap in a power-off mode. For example, having the power supply can be necessary to control the relay 160 that shifts from the main channel (e.g., conveying data, such as trading data, from the trading server 110 to the exchange E) to the back-up channel (e.g., conveying data, such as trading data, from the monitoring server 130 to the exchange E). In some embodiments, if the power supply is interrupted, the relay 160 would remain in the same state (e.g., with the same channel still active) as it was when the power supply was provided. In some embodiments, the switch 150 is configured such that, if the power supply is interrupted, the optical tapping functions described above continue to operate in the same manner as described.

In some embodiments, the exemplary switch 150 is configured to operate with various network bandwidths and is limited only by the physical capacity of the fiber optic itself. In some embodiments, the exemplary switch 150 is configured to operate on a physical layer. In some embodiments, the switch 150 is configured such that 1 Gigabyte (G) and 10G connections can be linked to the switch 150 without regard to a communication protocol used. In some embodiments, the switch 150 is configured to operate at other connection rates such as 40G, 50G, 100G, etc.

In some embodiments, the switch 150 includes components that utilize single-mode optics. In some embodiments, the switch 150 includes components that utilize multimode optics. In some embodiments, the switch 150 includes components that utilize a combination of both single-mode and multimode optics.

In some embodiments, the switch 150 can be configured to utilize various fiber types, by correspondingly adjusting the internal components to fit the type of fiber that is being utilized for optical connections in the system 100.

In some embodiments, the optical taps of the switch 150 include planar light-wave circuit ("PLC") splitters. In some embodiments, the optical taps of the switch 150 provide a symmetrical splitting of the signal 1×2. In some embodiments, symmetrical splitting can allow comparing the strength of the signal on both outputs.

In some embodiments, the optical taps of the switch 150 include Fused Biconical Taper ("FBT") splitters.

In some embodiments, the optical taps of the exemplary inventive switch of the switch 150 include Thin Film splitters.

In some embodiments, the relay 160 is configured so that it would take less than, for example, 4 ms to switch to a different channel after the channel-switching signal is sent to the switch 150. In some embodiments, the relay 160 is configured so that it would take less than, for example, 3 milliseconds (ms) to switch to a different channel after the channel-switching signal is sent to the switch 150. In some embodiments, the relay 160 is configured so that it would take less than, for example, 2 ms to switch to a different channel after the channel-switching signal is sent to the switch 150. In some embodiments, the relay 160 is configured so that it would take less than, for example, 1 ms to switch to a different channel after the channel-switching signal is sent to the switch 150.

In some embodiments, the switch 160 includes one or more integrated circuits that are specifically programmed to be operate as a control module.

Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Basic, AJAX, Javascript). The aforementioned examples are, of course, illustrative and not restrictive.

In some embodiments, a system includes at least one switch, at least one first server, at least one second server, and a precision time protocol master clock, the at least one switch including at least one first optical tap, at least one relay, and at least one second optical tap, the at least one first server including a first internal clock and being configured to synchronize the first internal clock with the precision time protocol master clock in accordance with a precision time protocol, the at least one second server including a second internal clock and being configured to synchronize the second internal clock with the precision time protocol master clock in accordance with the precision time protocol, the precision time protocol master clock being configured to perform a time synchronization of the at least one first server and the at least one second server in accordance with the precision time protocol, the at least one first optical tap being configured to: i) receive a first data stream from at least one third server, ii) split the first data stream into a first copy data stream and a second copy data stream, iii) transmit the first copy data stream to the at least one first server, and iv) transmit the second copy data stream to the at least one second server, the at least one relay being configured to: i) receive a second data stream from the at least one first server, wherein the at least one first server has generated the second data stream in response to the first copy data stream, ii) receive a third data stream from the at least one second server, wherein the at least one second server has generated the third data stream in response to: 1) the second copy data stream and 2) at least one faulty indication, identifying that the at least one first server has failed to transmit the second data stream, and iii) transmit a fourth data stream to the at least one second optical tap, wherein the fourth data stream is either the second data stream or the third data stream based on a receipt of a switching indicator by the at least one relay, the at least one second optical tap being configured to: i) receive the fourth data stream, ii) split the fourth data stream into a third copy data stream and a fourth copy data stream, iii) transmit the third copy data stream to the at least one third server, and iv) transmit the fourth copy data stream to the at least one second server, wherein the second data stream is identical to the third data stream so as to confirm that one of the second data stream or the third data stream is transmitted to the at least one third server when the at least one first server has failed to transmit the second data stream.

In some embodiments, the first data stream is an optical data stream.

In some embodiments, the at least one first optical tap includes at least one of a planar light-wave circuit splitter, a fused biconical taper splitter, and a thin film splitter. In some embodiments, the at least one second optical tap includes at least one of a planar light-wave circuit splitter, a fused biconical taper splitter, and a thin film splitter.

In some embodiments, the precision time protocol master clock is configured to perform the time synchronization periodically at a frequency that is between once per second and one hundred times per second.

In some embodiments, a method includes providing at least one switch, the at least one switch comprising at least one first optical tap, at least one relay, and at least one second optical tap; providing at least one first server, the at least one first server comprising a first internal clock, wherein the at least one first server is configured to synchronize the first internal clock with a precision time protocol master clock in accordance with a precision time protocol; providing at least one second server, the at least one second server comprising a second internal clock, wherein the at least one second server is configured to synchronize the second internal clock with the precision time protocol master clock in accordance with the precision time protocol; providing the precision time protocol master clock, wherein the precision time protocol master clock is configured to perform a time synchronization of the at least one first server and the at least one second server in accordance with the precision time protocol; operating the at least one first optical tap to: i) receive a first data stream from at least one third server, ii) split the first data stream into a first copy data stream and a second copy data stream, iii) transmit the first copy data stream to the at least one first server, and iv) transmit the second copy data stream to the at least one second server; operating the at least one relay to: i) receive a second data stream from the at least one first server, wherein the at least one first server has generated the second data stream in response to the first copy data stream; ii) receive a third data stream from the at least one second server, wherein the at least one second server has generated the third data stream in response to: 1) the second copy data stream and 2) at least one faulty indication, identifying that the at least one first server has failed to transmit the second data stream; and iii) transmit a fourth data stream to the at least one second optical tap, wherein the fourth data stream is either the second data stream or the third data stream based on a receipt of a switching indicator by the at least one relay; operating the second optical tap to: i) receive the fourth data stream, ii) split the fourth data stream into a third copy data stream and a fourth copy data stream, iii) transmit the third copy data stream to the at least one third server, and iv) transmit the fourth copy data stream to the at least one second server, wherein the second data stream is identical to the third data stream so as to confirm that one of the second data stream or the third data stream is transmitted to the at least one third server when the at least one first server has failed to transmit the second data stream.

In some embodiments, the first data stream is representative of pricing data relating to at least one price of at least one tradeable object traded on at least one exchange. In some embodiments, the first server is configured to determine a first at least one trade to be made based on the pricing data, and wherein the second data stream is representative of the first at least one trade to be made based on the pricing data. In some embodiments, the second server is configured to determine a second at least one trade to be made based on the pricing data, the second at least one trade being identical to the first at least one trade, and wherein the third data stream is representative of the second at least one trade to be made based on the pricing data.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A system, comprising:
   at least one switch;
      wherein the at least one switch comprises:
         at least one first optical tap,
         at least one relay, and
         at least one second optical tap;
   at least one first server;
      wherein the at least one first server comprises a first internal clock;
      wherein the at least one first server is configured to synchronize the first internal clock with a precision time protocol master clock in accordance with a precision time protocol;
   at least one second server;
      wherein the at least one second server comprises a second internal clock;
      wherein the at least one second server is configured to synchronize the second internal clock with the precision time protocol master clock in accordance with the precision time protocol;
   the precision time protocol master clock;
      wherein the precision time protocol master clock is configured to enable a time synchronization of the at least one first server and the at least one second server in accordance with the precision time protocol;
   wherein the at least one first optical tap is configured to:
      i) receive a first data stream from at least one third server,
      ii) split the first data stream into a first copy data stream and a second copy data stream,
      iii) transmit the first copy data stream to the at least one first server, and
      iv) transmit the second copy data stream to the at least one second server;
   wherein the at least one relay is configured to:
      i) receive a second data stream from the at least one first server, wherein the at least one first server has generated the second data stream in response to the first copy data stream;
      ii) receive a third data stream from the at least one second server, wherein the at least one second server has generated the third data stream in response to:
         1) the second copy data stream and
         2) at least one faulty indication, identifying that the at least one first server has failed to transmit the second data stream; and
      iii) transmit a fourth data stream to the at least one second optical tap, wherein the fourth data stream is either the second data stream or the third data stream based on a receipt of a switching indicator by the at least one relay;

wherein the at least one second optical tap is configured to:
i) receive the fourth data stream,
ii) split the fourth data stream into a third copy data stream and a fourth copy data stream,
iii) transmit the third copy data stream to the at least one third server, and
iv) transmit the fourth copy data stream to the at least one second server; and
wherein the second data stream is identical to the third data stream to confirm that one of the second data stream or the third data stream is transmitted to the at least one third server when the at least one first server has failed to transmit the second data stream.

2. The system of claim 1, wherein the first data stream is an optical data stream.

3. The system of claim 1, wherein the at least one first optical tap includes at least one of a planar light-wave circuit splitter, a fused biconical taper splitter, or a thin film splitter.

4. The system of claim 1, wherein the at least one second optical tap includes at least one of a planar light-wave circuit splitter, a fused biconical taper splitter, or a thin film splitter.

5. The system of claim 1, wherein the precision time protocol master clock is configured to perform the time synchronization periodically at a frequency that is between once per second and one hundred times per second.

6. The system of claim 1, wherein the first data stream is representative of pricing data relating to at least one price of at least one tradeable object traded on at least one exchange.

7. The system of claim 6, wherein the at least one first server is configured to determine a first at least one trade to be made based on the pricing data, and wherein the second data stream is representative of the first at least one trade to be made based on the pricing data.

8. The system of claim 7, wherein the at least one second server is configured to determine a second at least one trade to be made based on the pricing data, the second at least one trade being identical to the first at least one trade, and wherein the third data stream is representative of the second at least one trade to be made based on the pricing data.

9. A method, comprising:
providing at least one switch, the at least one switch comprising at least one first optical tap, at least one relay, and at least one second optical tap;
providing at least one first server, the at least one first server comprising a first internal clock, wherein the at least one first server is configured to synchronize the first internal clock with a precision time protocol master clock in accordance with a precision time protocol;
providing at least one second server, the at least one second server comprising a second internal clock, wherein the at least one second server is configured to synchronize the second internal clock with the precision time protocol master clock in accordance with the precision time protocol;
providing the precision time protocol master clock, wherein the precision time protocol master clock is configured to enable a time synchronization of the at least one first server and the at least one second server in accordance with the precision time protocol;
operating the at least one first optical tap to:
i) receive a first data stream from at least one third server,
ii) split the first data stream into a first copy data stream and a second copy data stream,
iii) transmit the first copy data stream to the at least one first server, and
iv) transmit the second copy data stream to the at least one second server;
operating the at least one relay to:
i) receive a second data stream from the at least one first server, wherein the at least one first server has generated the second data stream in response to the first copy data stream;
ii) receive a third data stream from the at least one second server, wherein the at least one second server has generated the third data stream in response to:
1) the second copy data stream and
2) at least one faulty indication, identifying that the at least one first server has failed to transmit the second data stream; and
iii) transmit a fourth data stream to the at least one second optical tap, wherein the fourth data stream is either the second data stream or the third data stream based on a receipt of a switching indicator by the at least one relay;
operating the at least one second optical tap to:
i) receive the fourth data stream,
ii) split the fourth data stream into a third copy data stream and a fourth copy data stream,
iii) transmit the third copy data stream to the at least one third server, and
iv) transmit the fourth copy data stream to the at least one second server,
wherein the second data stream is identical to the third data stream to confirm that one of the second data stream or the third data stream is transmitted to the at least one third server when the at least one first server has failed to transmit the second data stream.

10. The method of claim 9, wherein the first data stream is an optical data stream.

11. The method of claim 9, wherein the at least one first optical tap includes at least one of a planar light-wave circuit splitter, a fused biconical taper splitter, or a thin film splitter.

12. The method of claim 9, wherein the at least one second optical tap includes at least one of a planar light-wave circuit splitter, a fused biconical taper splitter, or a thin film splitter.

13. The method of claim 9, wherein the precision time protocol master clock is configured to perform the time synchronization periodically at a frequency that is between once per second and one hundred times per second.

14. The method of claim 9, wherein the first data stream is representative of pricing data relating to at least one price of at least one tradeable object traded on at least one exchange.

15. The method of claim 14, wherein the at least one first server is configured to determine a first at least one trade to be made based on the pricing data, and wherein the second data stream is representative of the first at least one trade to be made based on the pricing data.

16. The method of claim 15, wherein the at least one second server is configured to determine a second at least one trade to be made based on the pricing data, the second at least one trade being identical to the first at least one trade, and wherein the third data stream is representative of the second at least one trade to be made based on the pricing data.

* * * * *